United States Patent [19]

Tsuneka et al.

[11] Patent Number: 5,821,301

[45] Date of Patent: Oct. 13, 1998

[54] MODIFIED POLYOLEFIN RESIN COMPOSITION FOR POLYOLEFIN PLASTIC PAINTS, AND METHOD FOR PRODUCING THE SAME

[75] Inventors: Tatsuo Tsuneka; Takafumi Masuda; Kenichiro Isomoto; Teruaki Ashihara; Shozo Maekawa; Tetsuzo Nishioka; Ryozo Orita, all of Takasago, Japan

[73] Assignee: Toyo Kasei Kogyo Company Limited, Osaka, Japan

[21] Appl. No.: 835,568

[22] Filed: Apr. 9, 1997

[51] Int. Cl.$^6$ .................................................. C08F 10/00
[52] U.S. Cl. ................. 525/64; 525/285; 525/333.7; 525/385; 525/403; 525/523; 525/530
[58] Field of Search .......................... 525/64, 285, 333.7, 525/385, 403, 523, 530

[56] References Cited

U.S. PATENT DOCUMENTS

| | | | |
|---|---|---|---|
| 4,548,985 | 10/1985 | Yazaki et al. | 525/65 |
| 4,683,264 | 7/1987 | Urata et al. | 525/65 |

OTHER PUBLICATIONS

Sathe et al., "Grafting of Maleic Anhydride Onto Polypropylene: Synthesis And Characterization", *Journal of Applied Polymer Science*, vol. 53, 239–245 (1994).

*Primary Examiner*—Edward J. Cain
*Attorney, Agent, or Firm*—Wenderoth, Lind & Ponack, L.L.P.

[57] ABSTRACT

Disclosed is a modified chlorinated polyolefin resin composition, as well as a method for producing the same, which has adhesion to polyolefin substrates without the need of steam-washing or degreasing the polyolefin surface with chlorine-based organic solvents such as trichloroethane, and which is improved in such properties as interlayer adhesion to base-coats and/or top-coats and gasohol resistance. The modified polyolefin resin composition for polyolefin resin paints comprises: a chlorinated polyolefin having an acid value of 1 to 500 mg·KOH/g, which is obtained by chlorinating a polyolefin modified with one kind, or more than one kind, of compounds selected from a group consisting of α, β-unsaturated carboxylic acids and/or acid anhydrides thereof in a range of 1 to 50% by weight; and a compound and/or a resin thereof having one epoxy group per molecule represented by the structural formula as described in the specification.

6 Claims, No Drawings

MODIFIED POLYOLEFIN RESIN COMPOSITION FOR POLYOLEFIN PLASTIC PAINTS, AND METHOD FOR PRODUCING THE SAME

BACKGROUND OF THE INVENTION

(1) Field Of The Invention

The present invention relates to a modified polyolefin resin composition used as primers for paints for molded bodies or films containing polyolefin resins, for example, polypropylene, ethylene -propylene copolymers or ethylene -propylene -butene copolymers, as main components, and a method for producing the same. More specifically, the invention relates to a modified chlorinated polyolefin resin composition containing epoxy compounds having one epoxy group in the molecule or resins thereof that can provide a coating film having good properties in the adhesion to substrates, the interlayer adhesion to base-coats and/or top-coats, gasohol resistance, moisture resistance, shock resistance, flex resistance, and the like, which are obtained when applied onto the surface of polyolefin substrates without steam-washing or degreasing with chlorine-based organic solvents such as trichloroethane, and also relates to a method for producing the same.

(2) Description Of The Prior Art

Polyolefin resins, which have in general relatively low prices and excellent properties such as chemical resistance, water resistance and heat resistance, are widely used as industrial materials for parts of automobiles or the like. Having such characteristics, however, the polyolefin resins are crystalline with no reactive functional groups on the surface, making it difficult to attain painting or adhesion on polyolefin molded bodies or films. For improvement of this difficulty, attempts have been made to modify the resin surface by acid treatment or by physical processes such as corona discharge or plasma treatment so that the adhesion force of coating films is enhanced. In the painting process of automobile bumpers, for example, there has been a need of first removing oil deposited on the material surface by steam-washing or degreasing the plastic surface with chlorine-based organic solvents such as trichloroethane. This is because these chlorine-based organic solvents have a strong detergency to oil. However, in such cases, the process would be complicated, or otherwise a vast amount of investment for facilities would be involved. Also, the complicated process or the investment for facilities could not necessarily be rewarded with satisfactory effects. Moreover, because those chlorine-based organic solvents cause destruction of the ozone layer surrounding the earth, the production, use and transport of chlorine-based organic solvents have been fully prohibited worldwide since 1995.

A cured paint composition, as disclosed in Japanese Patent Publication No. HEI 1-16414, which is obtained by a crosslinking reaction of chlorinated polyolefins, which have been modified with unsaturated polycarboxylic acids or their anhydrides and further chlorinated, with a compound having two or more epoxy groups per molecule and/or resins thereof, although improved in the gasohol resistance, has a problem that particles are formed during the storage period before use in the spray painting or other coating processes. As another problem, during the production of solids of the aforementioned modified chlorinated polyolefin, a crosslinking reaction would occur due to high temperature in the solidification equipment, as seen in Japanese Patent Laid-Open Publication No. SHO 59-112021, such that gel formation would occur when the solid is re-dissolved.

SUMMARY OF THE INVENTION

An object of the present invention is to provide a modified chlorinated polyolefin solid which has an adhesion property to polyolefin substrates without the need of steam-washing or degreasing the polyolefin surface with chlorine-based organic solvents such as trichloroethane, and which is improved in such properties as interlayer adhesion to base-coats and/or top-coats and gasohol resistance. Another object of the invention is to solve such problems as the formation of particles during the storage of cured paint compositions as seen in Japan Patent Publication HEI 1-16414, or the formation of a gel that would occur when the solid materials obtained are re-dissolved.

DETAILED DESCRIPTION OF THE INVENTION

In order to solve the problems as described above, in a first aspect, the present invention provides a modified polyolefin resin composition for polyolefin resin paints, comprising: a chlorinated polyolefin (1) having an acid value of 1 to 500 mg·KOH/g, which is obtained by chlorinating a polyolefin modified with one kind, or more than one kind, of compounds selected from a group consisting of α, β-unsaturated carboxylic acids and/or acid anhydrides thereof in a range of 1 to 50% by weight; and a compound and/or a resin thereof (2) having one epoxy group per molecule represented by the following structural formula:

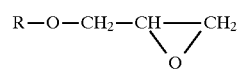

wherein R represents

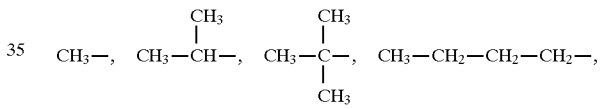

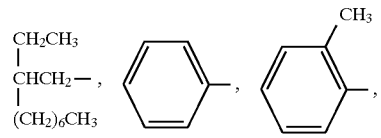

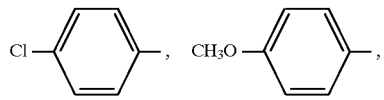

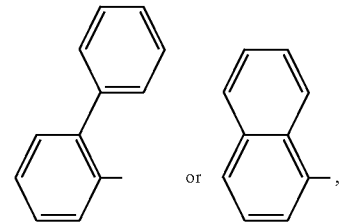

In a second aspect, the present invention provides a method for producing a modified chlorinated polyolefin resin composition, comprising a step of: desolvating and solidifying a modified polyolefin resin composition for polyolefin resin paints, the modified polyolefin resin composition comprising: a modified chlorinated polyolefin (1) having an acid value of 1 to 500 mg·KOH/g, which is obtained by chlorinating a polyolefin modified with one kind, or more than one kind, of compounds selected from a group consisting of α, β-unsaturated carboxylic acids and/or acid anhydrides thereof in a range of 1 to 50% by weight; and a compound and/or a resin thereof (2) having one epoxy group per molecule represented by the foregoing structural formula.

In a third aspect, the present invention provides the modified polyolefin resin composition for polyolefin resin paints according to the first aspect of the invention, wherein the epoxy value of the compound having one epoxy group per molecule and/or resin thereof (2) is within a range of 10 to 1000 g/molar equivalence.

In a fourth aspect, the present invention provides a method for producing a polyolefin resin composition according to the second aspect of the invention, wherein the epoxy value of the compound having one epoxy group per molecule and/or resin (2) is within a range of 10 to 1000 g/molar equivalence.

In a fifth aspect, the present invention provides a method for producing a polyolefin resin composition according to the second aspect of the invention, wherein a ratio in parts by weight of the modified chlorinated polyolefin (1) to the compound having one epoxy group per molecule and/or resin thereof (2) is within a range of 100:0.1 to 50.

In a sixth aspect, the present invention provides the method for producing a polyolefin resin composition according to the second aspect of the invention, characterized by desolvating and solidifying the modified polyolefin resin composition for polyolefin resin paints, the modified polyolefin resin composition being obtained in a moment from a modified chlorinated polyolefin solution by supplying the modified chlorinated polyolefin solution to an extruder with vent stacks which has a desolvating suction member provided at a screw shaft having an opening at an upper portion of the screw shaft and which has an underwater cut pelletizer at a discharge port of the extruder.

In a seventh aspect, the present invention provides a method for solidifying a polyolefin resin composition, characterized by desolvating and solidifying the modified polyolefin resin composition for polyolefin resin paints according to the second aspect of the invention, the modified polyolefin resin composition being obtained in a moment from a modified chlorinated polyolefin solution by supplying the modified chlorinated polyolefin solution to an extruder with vent stacks which has a desolvating suction member provided at a screw shaft having an opening at an upper portion of the screw shaft and which has a cooling-drum type flaker at a discharge port of the extruder.

It has been found that the modified polyolefin resin compositions of the invention to be used as paints for polyolefin resin molded bodies or films can advantageously yield coating films having excellent adhesion to polyolefin substrates as well as interlayer adhesion to base-coats and/or top-coats, and having good properties such as gasohol resistance, moisture resistance, shock resistance and flex resistance. In this case, if the epoxy value of the compounds having one epoxy group per molecule and/or resins thereof (2) is less than 10 g/molar equivalence, the effect as a compound having an epoxy group and/or resin thereof is not exhibited. On the other hand, if the epoxy value exceeds 1000 g/molar equivalence, the modified polyolefin resin composition cannot be used for spray painting because of increased viscosity of the polyolefin resin composition.

With regard to the cured paint composition for polypropylene resins as disclosed in the aforementioned Japanese Patent Publication No. HEI 1-16414, which comprises a chlorinated polyolefin compound modified with unsaturated polycarboxylic acids or acid anhydrides thereof, and compounds having two or more epoxy groups per molecule and/or resins thereof, it has been found according to the results of the present inventors' studies that the solution stability before use in the spray painting or other coating processes is problematic because of the use of the compound having two or more epoxy groups per molecule and/or resins thereof. It has also been found that the modified polyolefin resin composition has a drawback that particles would be formed during the storage of the solution. Therefore, and finding that using the compound having one epoxy group per molecule and/or resins thereof (2) as described above makes it possible to suppress the crosslinking reaction due to the compound having two or more epoxy groups per molecule and/or resins thereof and acid anhydrides or organic acids during the storage before use in the spray coating or other coating processes, the present inventors have made further research and studies, thereby completing the present invention. The modified polyolefin resin composition for polyolefin resin paints can yield coating films having an excellent adhesion to polyolefin-based substrates or films, interlayer adhesion to base-coats and/or top-coats, and good properties such as gasohol resistance, moisture resistance, shock resistance and flex resistance.

The modified chlorinated polyolefin of the invention is produced in a solution state, such as toluene solution, whereas the product for actual use is transported in the form of a modified chlorinated polyolefin solid from the viewpoints of transportation costs and safety, for example in the cases of remote places, whether abroad or domestic, which could be said to be reasonable. Thus, as means for solidifying the modified polyolefin, for example, an apparatus that the present applicant previously described in Japanese Patent Publication No. HEI 7-59607 is used. The present inventors have found that when the compound having one epoxy group per molecule and/or resins thereof (2) are used as stabilizers, the formation of particles or gel upon solidification can be suppressed.

The solidification process may be a process of producing a solid-state modified chlorinated polyolefin in a moment from a halogenated-solvent solution of a modified chlorinated polyolefin solution by feeding the modified chlorinated polyolefin solution dissolved in the halogenated solvent ranging from dilute to any concentration to an extruder with vent stacks which has a desolventing suction mechanism provided at its screw shaft and which has an underwater cut pelletizer provided at the discharge port of the extruder, or a process of producing a solid-state modified chlorinated polyolefin in a moment from a halogenated-solvent solution of a modified chlorinated polyolefin solution by feeding the modified chlorinated polyolefin solution dissolved in the halogenated solvent, via a flash concentrator, to an extruder with vent stacks which has a desolventing suction mechanism at its screw shaft and which has an underwater cut pelletizer at the discharge port of the extruder. With this,process, it is made possible by using the extruder equipped with vent stacks to provide solids of the chlorinated polyolefin from halogenated-solvent solutions of the modified halogenated polyolefin in an arbitrary resin concentration ranging from very dilute concentrations of about 5% to high concentrations of more than 50%.

While halogenated hydrocarbons such as tetrachloroethylene may be used as halogenated solvents for use in this invention, chloroform is especially preferable. The extruder equipped with vent stacks to be used in this invention is described in detail below. While biaxial, four-axial or other multi-axial extruders equipped with vent stacks are known, anisotropic and isotropic multi-axial extruders of the biaxial or four-axial type are suitable for renewing the resin surface and for obtaining self-cleaning characteristic, respectively. As for the configuration of the axis of the extruder equipped with vent stacks, various kinds of configurations such as discs, seal rings and rotors as well as the spiral configuration can be used in combination for the purposes of mixing or kneading in the cylinder, enhanced heat generation due to mechanical kneading, sealing characteristic and the like. The vent stack for removing the evaporated solvent may be provided either singly or more than one, but preferably 2 to 5 in number, in which arrangement the solvent evaporated from the vent port is preferably condensed and recovered through condensers. While the pressure in each vent zone may be atmospheric or reduced, a degree of pressure reduction of 50 mmHg·abs. to 400 mmHg·abs. is preferable for the purpose of lessening the volume of the remaining solvent. For example, the pressure may be given in a combination of 200 mmHg·abs., 150 mmHg·abs. and 50 mmHg·abs., as viewed from the supply side of the raw solution, but it is not limited to these values. The method of heating the cylinder part of the extruder equipped with vent stacks may be electric heating, steam heating, warm-water heating, and the like as conventionally available.

The heating device in this invention is divided into several blocks, where the blocks can be temperature controlled independently of one another. Although the evaporation temperature on the supply side of the raw material where the concentration of the modified chlorinated polyolefin is low may be, for example, in the range of 60° to 170° C., the temperature on the discharge side where the concentration of the modified chlorinated polyolefin becomes high as a result of evaporation needs to be adjusted to within the range of 70° to 150° C. to prevent the modified chlorinated polyolefin from being deteriorated in quality due to heat degradation. It is difficult to effectively evaporate the solvent off at a temperature less than 70° C. while, at a temperature exceeding 170° C., heat degradation of the modified chlorinated polyolefin will occur due to overheating. The preferable temperature range is from 80° to 140° C. The halogenated-solvent solution of the modified chlorinated polyolefin supplied to the extruder is evaporated from the vent port by being heated with the cylinder of the extruder. Because the vent-up phenomenon becomes vigorous when the concentration of the modified chlorinated polyolefin is low, vent stuffs are inserted into several cylinders having no openings or into the vent portions to suppress the vent-up phenomenon of the modified chlorinated polyolefin, thereby making it possible to produce the modified chlorinated polyolefin of the invention from resin solutions of low concentrations. The modified chlorinated polyolefin resin after completing the solvent removal is cut into pellets by using an underwater cut pelletizer, which is unique to the present invention, attached to the discharge port at the front end of the extruder. An alternative method available is that the modified chlorinated polyolefin resin after completing the solvent removal is solidified by using a cooling-drum type flaker without being passed through the underwater cut pelletizer. This method has a high cooling efficiency, bearing an advantage that chemical changes of the resin can be prevented because the resin is kept out of contact with water.

The chlorinated polyolefin (1) to be used in this invention can be produced by methods known in the art. In one example of the production method, it can be produced by the steps comprising: mixing and dissolving one kind, or more than one kind, of polyolefin resins such as polypropylene, ethylene -propylene copolymer, or ethylene -propylene -butene copolymer; modifying the molten polyolefin resin, denatured by heat degradation if necessary, with α, β-unsaturated carboxylic acids and/or anhydrides thereof in the presence of a radical generator followed by dissolving in a chlorinated solvent; and blowing chlorine gas in under atmospheric pressure or compressed pressure at a temperature of 50° to 150° C. under UV radiation or in the presence of catalysts, thereby allowing the resin to react.

Examples of radical generators for use in the modification reactions include peroxides such as di-tert-butyl perphthalate, tert-butyl hydroperoxide, di-cumyl peroxide, benzoyl peroxide, tert-butyl peroxybenzoate, tert-butyl peroxyethylhexanoate, tert-butyl peroxypivalate, methylethyl ketone peroxide and di-tert-butyl peroxide; and azonitriles such as azobis-isobutyronitrile and azobis-isopropionitrile. Examples of α, β-unsaturated carboxylic acids and/or acid anhydrides thereof for use in the modification reactions include maleic acid, maleic anhydride, fumaric acid, citraconic acid, citraconic anhydride, mesaconic acid, itaconic acid, itaconic anhydride, aconitic acid, aconitic anhydride and himic anhydride.

The degree of chlorination of the chlorinated polyolefin (1) modified with α, β-unsaturated carboxylic acids and/or acid anhydrides thereof for use in this invention may be in the range of 1 to 50% by weight, the degree of 15 to 35% by weight being preferable. When the degree of chlorination is lower than 5% by weight, the condition of the solution becomes worse while, when the degree of chlorination is higher than 50% by weight, the adhesion property with polyolefin resins and solvent resistance will be deteriorated. The acid value of the chlorinated polyolefin (1) is in the range of 1 to 500 mg·KOH/g, the value of 10 to 400 mg·KOH/g being preferable. When the acid value is lower than 1 mg·KOH/g, solvent resistance will be decreased while, when the acid value is higher than 500 mg·KOH/g, the interlayer adhesion property to base-coats and/or top-coats will be weakened.

It is preferable that the compound having one epoxy group per molecule and/or resin thereof (2) to be used in this invention has a good compatibility with chlorinated polyolefin (1). Examples of the compound are phenylglycidyl ether, 2-methylphenylglycidyl ether, tert-butylphenylglycidyl ether, 4-chlorophenylglycidyl ether, 4-methoxyphenylglycidyl ether, 2-biphenylglycidyl ether, 1-naphthylglycidyl ether, methylglycidyl ether, isopropylglycidyl ether, butylglycidyl ether, tert-butylglycidyl ether, 2-ethylglycidyl ether, and the like. These compounds may be used either singly or in combination, where mixing and using two or more kinds gives improved effect.

It is desirable that the blending ratio of chlorinated polyolefin (1) with the compound having one epoxy group per molecule and/or resin thereof (2) is in the range of 100:0.1 to 50 in parts by weight from the viewpoint of embodying the invention. When the ratio of the compound having an epoxy group and resin thereof (2) is less than 0.1, its stabilization effect becomes insufficient while, when the ratio exceeds 50, its adhesion property to molded bodies or films of the polyolefin resin would be decreased.

Use of the compound having an epoxy group and/or resin thereof (2) is advantageous in that crosslinking reactions of bifunctional epoxy compounds with acid anhydrides or organic acids is suppressed during the period of storage before use in the spray painting or other coating processes. The primer of paints that is the object of this invention may of course be practically applied by using the resin composition of the invention alone. However, it is a rather common case that the resin composition of the invention is formed into a paint by being blended with acrylic polymers, urethane polymers and/or polymers like alkyd resins, inorganic pigments such as aluminum paste, aluminum oxide, titanium dioxide, talc and calcium carbonate, and other organic pigments, and organic solvents with a view to improving the durability of coating films. It is of particular importance from the industrial point of view to suppress the particle formation and the viscosity increasing phenomenon during the paint-forming process or during the storage of the modified chlorinated polyolefin resin composition before use, which has been found by the present inventors' studies as described before, or to improve the workability in the spraying process.

Aromatic organic solvents like toluene or xylene are most preferable as solvents to be used for the paint compositions according to the present invention. Fillers that can be used suitably are inorganic pigments such as aluminum paste, aluminum oxide, titanium dioxide, talc and calcium carbonate, or other organic pigments. The structural formula of the compound having one epoxy group per molecule and/or resins thereof (2) to be used in the present invention is as shown previously.

EXAMPLES

The present invention will now be described by way of examples thereof. However, the invention is not limited to these examples.

(Example 1)

In an autoclave equipped with a stirrer were placed 280 g of isotactic polypropylene (Mw=30,000), 16.8 g of maleic anhydride, 5.6 g of dicumyl peroxide and 420 g of toluene. After replacing the air in the autoclave with nitrogen for about 5 minutes, the mixture was allowed to react for 5 hours at 140° C. under heating and stirring. After the reaction was completed, the reaction solution was poured into a large amount of methyethyl ketone to precipitate a resin. The resin was washed with methylethyl ketone several times, by which unreacted maleic anhydride was removed. Then, 280 g of the resulting resin modified with maleic anhydride and 2520 g of chloroform were placed in the autoclave equipped with a stirrer and, after replacement with nitrogen for 5 minutes, the mixture was heated to 110° C. to completely dissolve the resin. Subsequently, 2.8 g of di-tert-butylperoxide was added and chlorine gas was blew in. After blowing in 189 g of chlorine gas for 3 hours, nitrogen was blown in flushed, by which unreacted chlorine gas and hydrogen chloride were removed. Into the reaction solution was added Denacol EX-141 (made by Nagase Chemical Industry, Inc., an epoxy compound having an epoxy value of 154 modified with phenylglycidyl ether) in an amount of 4% by weight with respect to the resin, followed by sufficient stirring. A chloroform solution of the resulting chlorinated polypropylene modified with maleic anhydride (maleic anhydride content: 1.0% by weight, chlorine content: 22.2% by weight, Mw=25,000) was supplied to an extruder equipped with vent stacks. The chlorinated polyolefin was desolvated in the cylinder resulted in a solid by an underwater cut pelletizer.

The blending formulation and the results of performance tests are listed in Table 1 and Table 2, respectively.

TABLE 1

| | Kind of Epoxide | Amount of Addition (parts by weight) |
| --- | --- | --- |
| Examples 1, 2, 5, 6, 9, 10 | Denacol EX-141 | 4 |
| Examples 3, 4, 7, 8, 11, 12 | Epolite M-1230 | 4 |
| Comparative Examples 1 to 3 | Epicoat 828 | 4 |

(1) Interlayer adhesion:

A polypropylene plate (a press-molding of Mitsui Noblene SB-E3 by prescribed process, 100 mm×50 mm, 2 mm thick) was washed at the surface with isopropyl alcohol, while solutions of the compositions of Examples 1 to 12 and Comparative Examples 1 to 3 dissolved in toluene were adjusted in viscosity by thinner to a value of 12 seconds, as measured by Ford viscosity cup No. 4. Thereafter, the plate was spray-coated by using an air-spray gun (made by Meiji Kikai Seisakusho, Co., Type F-88). The coated plate was dried at 80° C. for 30 minutes and allowed to cool to room temperature. Next, a melamine paint (made by Kansai Paint K.K.) and thinner were mixed to give a coating amount of 50 to 60 g/m², and coated on the plate by using the air-spray gun. The coated plate was dried at 120° C. for 30 minutes and, after allowing to stand at room temperature for 24 hours, subjected to performance tests. For the evaluation, 25 meshes were formed on the coating surface so as to reach the ground, and then cellophane tape was applied and bonded onto the coating surface and torn off at an angle of 900° with respect to the coating surface, where the number of the remaining meshes was calculated.

(2) Interlayer adhesion after immersion in warm water:

A polypropylene plate coated by the method of (1) was immersed in city water kept at 40° C. for 240 hours, and evaluated in the same way as in (1).

(3) Gasohol resistance:

A polypropylene plate coated by the method of (1) was immersed in gasohol (regular gasoline: ethanol=90:10 in weight ratio) kept at 20° C. for 120 minutes, and the state of the coated film was evaluated.

(4) Viscosity increase:

A 20% by weight toluene solution of the composition was left in a thermostatic oven kept at 40° C. for one month, and its difference in viscosity before and after the elapse was determined (○:0–0.5 poise; Δ: 0.5–1 poise; x: over 1 poise).

(5) Particle formation:

Particle formation was observed with respect to a 20% by weight toluene solution of the composition left in a thermostatic oven kept at 40° C. for one month, according to the method prescribed in JIS K5400 (○: good; x: bad).

TABLE 2

| | Base polymer | Anal. value (%) MAH[1] | Cl[2] | Stabilizer[3] | Solidification process[4] | Interlayer adhesion | Interlayer adhesion after immersion in warm water | Gasohol resistance | Viscosity increase | Particle formation |
|---|---|---|---|---|---|---|---|---|---|---|
| Example 1 | IPP (Mw = 25000) | 1.0 | 22.2 | ① | A | 25 | 25 | no peeling | ○ | ○ |
| Example 2 | IPP (Mw = 25000) | 1.0 | 22.2 | ① | B | 25 | 25 | no peeling | ○ | ○ |
| Example 3 | IPP (Mw = 25000) | 1.0 | 22.2 | ② | A | 25 | 25 | no peeling | ○ | ○ |
| Example 4 | IPP (Mw = 25000) | 1.0 | 22.2 | ② | B | 25 | 25 | no peeling | ○ | ○ |
| Example 5 | IPP (Mw = 40000) | 0.8 | 21.9 | ① | A | 25 | 25 | no peeling | ○ | ○ |
| Example 6 | IPP (Mw = 40000) | 0.8 | 21.9 | ① | B | 25 | 25 | no peeling | ○ | ○ |
| Example 7 | IPP (Mw = 40000) | 0.8 | 21.9 | ② | A | 25 | 25 | no peeling | ○ | ○ |
| Example 8 | IPP (Mw = 40000) | 0.8 | 21.9 | ② | B | 25 | 25 | no peeling | ○ | ○ |
| Example 9 | Co-(B-P)[5] | 1.2 | 24.4 | ① | A | 25 | 25 | no peeling | ○ | ○ |
| Example 10 | Co-(B-P)[5] | 1.2 | 24.4 | ① | B | 25 | 25 | no peeling | ○ | ○ |
| Example 11 | Co-(B-P)[5] | 1.2 | 24.4 | ② | A | 25 | 25 | no peeling | ○ | ○ |
| Example 12 | Co-(B-P)[5] | 1.2 | 24.4 | ② | B | 25 | 25 | no peeling | ○ | ○ |
| Comparative Example 1 | IPP (Mw = 25000) | 1.0 | 22.2 | ③ | A | 21 | 19 | no peeling | Δ | x |
| Comparative Example 2 | IPP (Mw = 40000) | 0.8 | 21.9 | ③ | A | 22 | 21 | no peeling | Δ | x |
| Comparative Example 3 | Co-(B-P)[5] | 1.2 | 24.4 | ③ | A | 20 | 19 | no peeling | Δ | x |

[1])maleic anhydryde content, [2])chlorine content, [3])① Denacol Ex-141; ② Epolite M-1230; ③ Epicoat 828 [4])A = underwater cut pelletizer, B = cooling-drum type flaker, [5])butene-propylene copolymer Interlayer adhesion and interlayer adhesion after immersion in warm water: full marks=25

Gasohol resistance: no peeling=good, peeling=bad

Viscosity increase: ○=0–0.5 poise, Δ=0.5–1 poise, x=over 1 poise

Particle formation:

○=No particles with the particle size over 40 μm were found, and the number of particles with the particle size under 40 μm was less than 5;

x=Particles with the particle size over 40 μm were found, and the number of particles with the particle size under 40 μm was not less than 5.

(Example 2)

Solid flakes were obtained by the same process as in Example 1, except that a cooling-drum type flaker was used instead of the underwater cut pelletizer. The results of performance evaluation are shown in Table 2.

(Example 3)

Solid pellets were obtained by the same process as in Example 1, except that Epolite M1230 (made by Kyoeisha Yushi Kagaku Kogyo K.K., an epoxy resin composed of a glycidyl ether mixture of long chain alkyl with an epoxy equivalence of 300 to 340) was added instead of Denacol EX-141. The blending formulation and the results of performance evaluation are shown in Table 1 and Table 2, respectively.

(Example 4)

Solid flakes were obtained by the same process as in Example 3, except that a cooling-drum type flaker was used instead of the underwater cut pelletizer. The results of performance evaluation are shown in Table 2.

(Comparative Example 1)

Solid pellets were obtained by the same process and conditions as in Example 1, except that Epicoat 828 (made by Shell Chemicals, Inc., an epoxy resin with epoxy equivalence 184–194, which is a condensate of bisphenol A and epichlorohydrin) was added instead of Denacol EX-141. The blending formulation and the results of performance evaluation are shown in Table 1 and Table 2, respectively.

(Example 5)

The composition obtained by the same process and conditions as in Example 1, except that 280 g of isotactic polypropylene (Mw=40,000), 16.8 g of maleic anhydryde, 5.6 g of benzoyl peroxide and 420 g of toluene were used instead, showed a maleic anhydride content of 0.8% by weight and a chlorine content of 21.9% by weight with Mw=35,000.

(Example 6)

Solid flakes were obtained by the same process as in Example 5, except that a cooling-drum type flaker was used instead of the underwater cut pelletizer. The results of performance evaluation are shown in Table 2.

(Example 7)

Epolite M-1230 was added instead of Denacol EX-141 under the same process and conditions as in Example 5. The blending formulation and the results of performance evaluation are listed in Table 1 and table 2, respectively.

(Example 8)

Solid flakes were obtained by the same process as in Example 7, except that a cooling-drum type flaker was used instead of the underwater cut pelletizer. The results of performance evaluation are shown in Table 2.

(Comparative Example 2)

Epicoat 828 was added instead of Denacol EX-141 under the same process and conditions as in Example 5. The blending formulation and the results of performance evaluation are listed in Table 1 and table 2, respectively.

(Example 9)

The composition obtained by the same process and conditions as in Example 1, except that butene—propylene copolymer (molar ratio of propylene: 74%, Mw=44,000) was used instead of isotactic polypropylene, showed a maleic anhydride content of 1.2% by weight and a chlorine content of 24.4% by weight with Mw=41,000.

(Example 10)

Solid flakes were obtained by the same process as in Example 9, except that a cooling-drum type flaker was used instead of the underwater cut pelletizer. The results of performance evaluation are shown in Table 2.

(Example 11)

Epolite M-1230 was added instead of Denacol EX-141 under the same process and conditions as in Example 9. The blending formulation and the results of performance evaluation are listed in Table 1 and Table 2, respectively.

(Example 12)

Solid flakes were obtained by the same process as in Example 11, except that a cooling-drum type flaker was used instead of the underwater cut pelletizer. The results of performance evaluation are shown in Table 2.

(Comparative Example 3)

Epicoat 828 was added instead of Denacol EX-141 under the same process and conditions as in Example 9. The blending formulation and the results of performance evaluation are listed in Table 1 and Table 2, respectively.

A modified chlorinated polyolefin (1) obtained by chlorinating a polyolefin modified with one kind, or more than one kind, of compounds selected from a group consisting of α, β-unsaturated carboxylic acids and/or anhydrides thereof is blended with a compound having one epoxy group per molecule and/or resin thereof (2), and then desolvated in an extruder with vent stacks and solidifed by an underwater cut pelletizer or a cooling-drum type flaker. The composition obtained in this way has good characteristics in addition to molded products of polyolefin such as polypropylene, interlayer adhesion to base-coats and/or top-coats, gasohol resistance, moisture resistance, shock resistance and flex resistance. The composition also shows less viscosity increase and remarkably less formation of particles, as compared with those blended with compounds having bifunctional epoxy groups.

What we claim is:

1. A modified polyolefin resin composition suitable for paints for polyolefin resins, said composition comprising (1) a chlorinated polyolefin having an acid value of 1 to 500 mg·KOH/g, which is obtained by chlorinating a polyolefin modified with one or more compounds selected from the group consisting of α, β-unsaturated carboxylic acids and acid anhydrides thereof in a range of 1 to 50% by weight, and (2) a compound and/or a resin thereof having one epoxy group per molecule represented by the following structural formula:

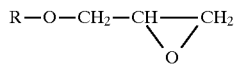

wherein R represents

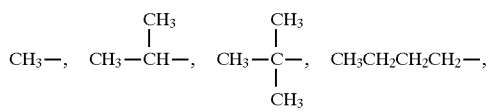

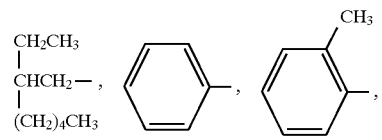

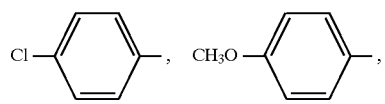

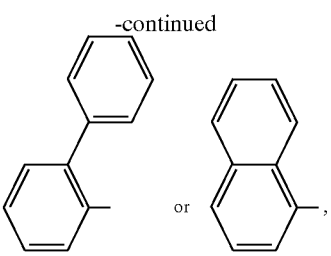

the ratio in parts by weight of (1):(2) being within a range of 100:0.1 to 50.

2. The modified polyolefin resin composition according to claim 1, wherein the compound and/or resin thereof having one epoxy group per molecule has an epoxy value within a range of 10 to 1000 g/molar equivalence.

3. A method for producing a concentrated or solid modified polyolefin resin composition, comprising a step of desolvating a solution of a modified polyolefin resin composition suitable for paints for polyolefin resins, said composition comprising (1) a chlorinated polyolefin having an acid value of 1 to 500 mg·KOH/g, which is obtained by chlorinating a polyolefin modified with one or more compounds selected from the group consisting of α, β-unsaturated carboxylic acids and acid anhydrides thereof in a range of 1 to 50% by weight, and (2) a compound and/or a resin thereof having one epoxy group per molecule represented by the following structural formula:

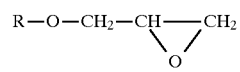

wherein R represents

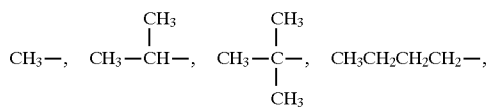

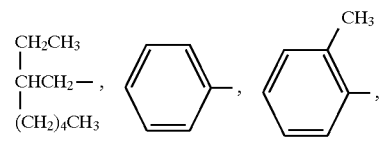

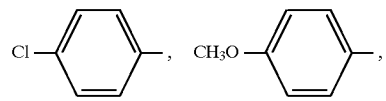

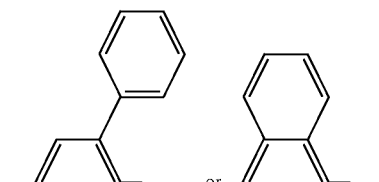

the ratio in parts by weight of (1):(2) being within a range of 100:0.1 to 50.

4. The method according to claim 10, wherein the compound and/or resin thereof having one epoxy group per molecule has an epoxy value within a range of 10 to 1000 g/molar equivalence.

5. A method for producing a solid modified polyolefin resin composition, comprising a step of desolvating and solidifying a solution of a modified polyolefin resin composition suitable for paints for polyolefin resins in a moment by supplying the solution to an extruder with vent stacks which has a desolvating suction member provided at a screw shaft having an opening at an upper portion of the screw shaft and which has an underwater cut pelletizer at a discharge part of the extruder; said composition comprising (1) a chlorinated polyolefin having an acid value of 1 to 500 mg·KOH/g, which is obtained by chlorinating a polyolefin modified with one or more compounds selected from the group consisting of α, β-unsaturated carboxylic acids and acid anhydrides thereof in a range of 1 to 50% by weight, and (2) a compound and/or a resin thereof having one epoxy group per molecule represented by the following structural formula:

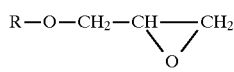

wherein R represents

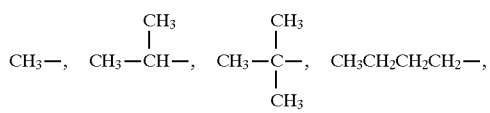

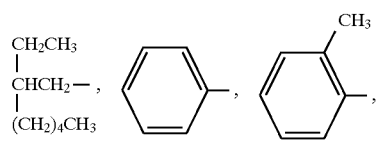

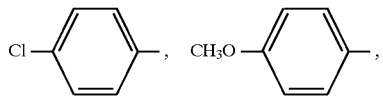

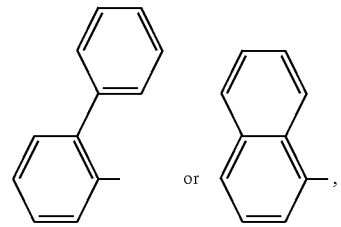

the ratio in parts by weight of (1):(2) being within a range of 100:0.1 to 50.

6. A method for producing a solid modified polyolefin resin composition, comprising a step of desolvating and solidifying a solution of a modified polyolefin resin composition suitable for paints for polyolefin resins in a moment by supplying the solution to an extruder with vent stacks which has a desolvating suction member provided at a screw shaft having an opening at an upper portion of the screw shaft and which has a cooling-drum type flaker at a discharge port of the extruder; said composition comprising (1) a chlorinated polyolefin having an acid value of 1 to 500 mg·KOH/g, which is obtained by chlorinating a polyolefin modified with one or more compounds selected from the group consisting of α, β-unsaturated carboxylic acids and acid anhydrides thereof in a range of 1 to 50% by weight, and (2) a compound and/or a resin thereof having one epoxy group per molecule represented by the following structural formula:

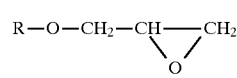

wherein R represents

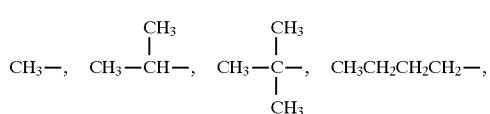

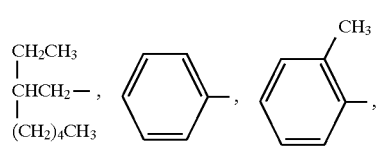

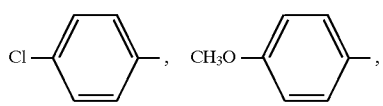

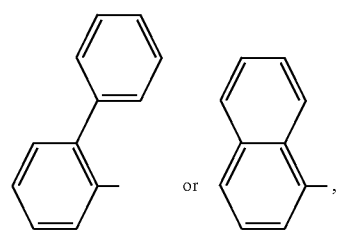

the ratio in parts by weight of (1):(2) being within a range of 100:0.1 to 50.

* * * * *